US010331550B2

(12) United States Patent
Keppel et al.

(10) Patent No.: US 10,331,550 B2
(45) Date of Patent: Jun. 25, 2019

(54) SYMMETRIC ADDRESSING

(71) Applicant: INTEL CORPORATION, Santa Clara, CA (US)

(72) Inventors: David Keppel, Mountain View, CA (US); Charles J. Archer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 15/282,700

(22) Filed: Sep. 30, 2016

(65) Prior Publication Data

US 2018/0217925 A1 Aug. 2, 2018

(51) Int. Cl.
*G06F 13/00* (2006.01)
*G06F 12/02* (2006.01)
*G06F 12/1009* (2016.01)

(52) U.S. Cl.
CPC ........ *G06F 12/023* (2013.01); *G06F 12/0284* (2013.01); *G06F 12/0292* (2013.01); *G06F 12/1009* (2013.01); *G06F 2212/1024* (2013.01); *G06F 2212/656* (2013.01); *G06F 2212/657* (2013.01)

(58) Field of Classification Search
CPC . G06F 12/023; G06F 12/0284; G06F 12/0292
See application file for complete search history.

(56) References Cited

U.S. PATENT DOCUMENTS

2005/0278487 A1* 12/2005 Blandy ............... G06F 12/0269 711/145
2010/0082887 A1* 4/2010 Mitsunaga .......... G06F 12/0246 711/103
2011/0060887 A1* 3/2011 Thatcher ............... G06F 3/0604 711/171

* cited by examiner

*Primary Examiner* — Charles Rones
*Assistant Examiner* — Han V Doan
(74) *Attorney, Agent, or Firm* — Grossman, Tucker, Perreault & Pfleger, PLLC

(57) ABSTRACT

This disclosure describes, in one embodiment an apparatus. The apparatus includes a processor; a memory, an application, collector circuitry and aggregator circuitry. The memory is to store one or more tasks. The application is associated with the one or more tasks. The collector circuitry is to identify a local free address range in at least one address space. The aggregator circuitry is to provide address range data to a subgroup aggregator. The provided address range data includes at least one local free address range.

19 Claims, 4 Drawing Sheets

SYMMETRIC ADDRESSING

This invention was made with Government support under contract number H98230-13-D-0124 awarded by the Department of Defense. The Government has certain rights in this invention.

FIELD

The present disclosure relates to addressing, in particular to, symmetric addressing.

BACKGROUND

A high-performance computing (HPC) system may be configured as a collection of separate nodes that communicate via a network. The HPC system may include on the order of ones, tens, hundreds, thousands of nodes. Each node may generally include a processor (containing one or more processing units), a local memory and a network controller. A node may include an application instance implemented as one or more tasks configured to execute on one or more processing units. An associated application may be configured to execute across one or more nodes. An address space may be allocated for each task. Address ranges in address spaces allocated to each task may vary across the address spaces, within a node and/or across nodes. Remapping operations of address ranges in address spaces within a node and/or between nodes may result in relatively high overheads in an HPC system with many address spaces and/or many nodes.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
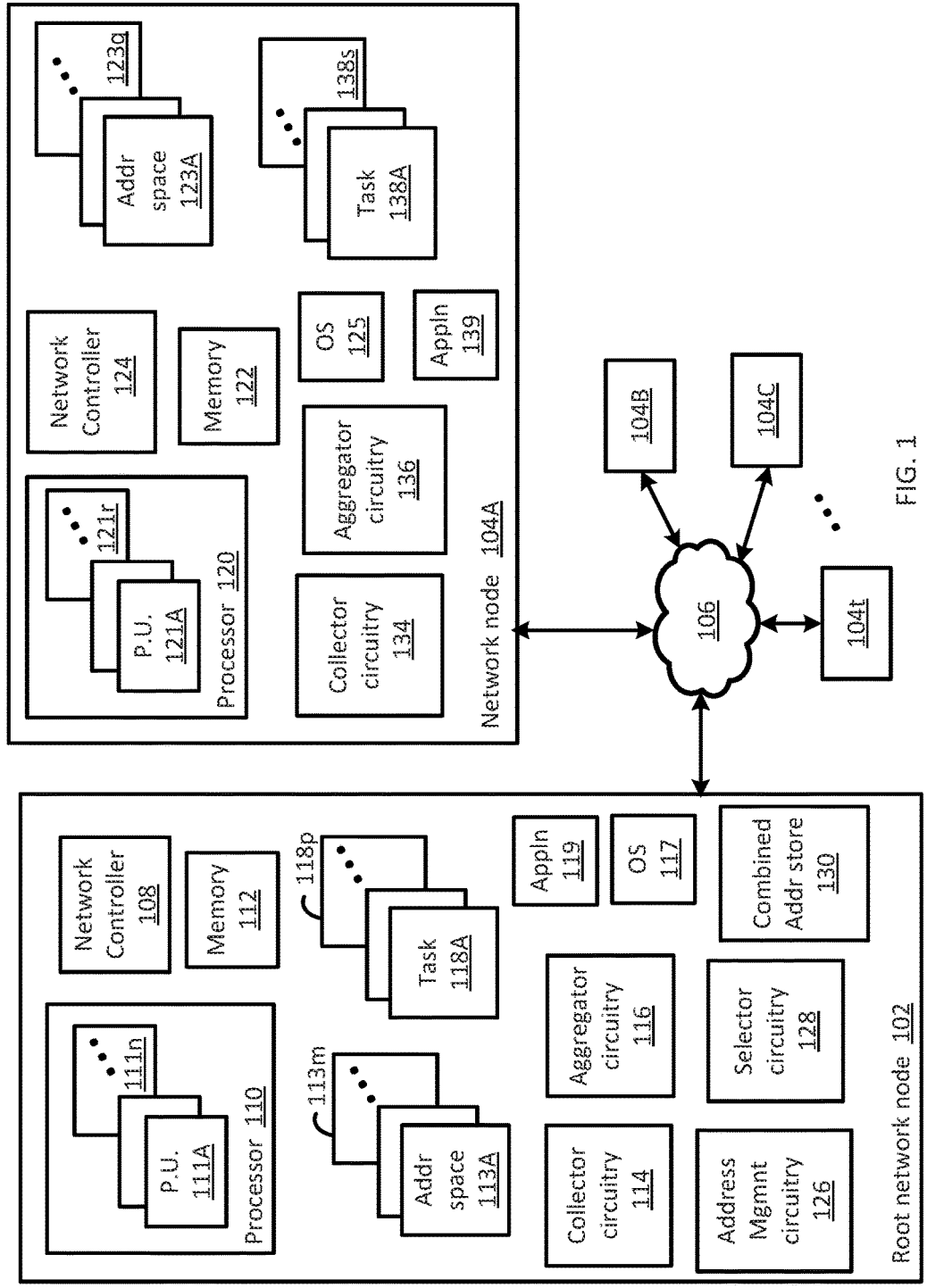
FIG. 1 illustrates a symmetric addressing system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to symmetric addressing. As used herein, symmetric addressing corresponds to common address ranges (i.e., common addresses) across a plurality of address spaces. The address spaces may be utilized by one or more tasks associated with one or more applications. The present disclosure provides techniques to identify free and/or busy address ranges of a plurality of address spaces in a network node and/or distributed across a plurality of network nodes. The network nodes may be included in, e.g., an HPC system.

As used herein, "task" corresponds to a thread managed by an operating system (OS), an application (e.g., user-level) and/or circuitry (e.g., a processor, processing unit ("core")). An OS-managed task may include one or more user-level threads. Generally, a plurality of tasks may run concurrently and/or serially. The plurality of tasks may run on a same or different cores, in a same or different address spaces and/or on a same or different nodes.

The techniques are configured to enable one or more tasks to utilize a common address range across a plurality of address spaces. In one example embodiment, busy/free address ranges may be identified for each address space in a network node then the individual busy/free address ranges may be aggregated to produce a common busy-free map. In another example embodiment, busy/free address ranges may be identified for each address space across a plurality of network nodes. The busy/free address ranges may be aggregated per node then across the plurality of network nodes to produce a global busy-free map.

Collector circuitry included in each network node is configured to identify a local free address range in at least one address space. Aggregator circuitry included in each network node is configured to provide address range data to a subgroup aggregator, e.g., a subgroup aggregator node or subgroup aggregator task. The provided address range data includes at least one local free address range. The aggregator circuitry may be further configured to combine the at least one local free address range with received address range date to yield the provided address range data.

Selector circuitry included in a root network node is configured to select one or more common free address ranges based, at least in part, on the busy-free map, i.e., combined address range data that includes address range data associated with a plurality of address spaces. Address management circuitry is configured to provide common free address range identifiers (e.g., common address ranges) to a plurality of tasks across one or more network nodes. Allocation of free address range(s) may then proceed based, at least in part, on the common free address range data. The search is designed for efficiency, and a mechanism for re-try is provided so that concurrent address space allocation changes may be accommodated. Thus, one or more tasks may utilize a common address range across one or more address spaces and/or network nodes.

FIG. 1 illustrates a symmetric addressing system 100 consistent with various embodiments of the present disclosure. Symmetric addressing system 100 generally includes a root network node 102 and a plurality of network nodes 104A, 104B, 104C, . . . , 104t, each configured to communicate with one another via a network fabric 106. For example, symmetric addressing system 100 may include on the order of ones, tens, hundreds, thousands, and/or more network nodes.

It is to be understood that the illustration of FIG. 1 is only for ease of description and that the network fabric 106 may include a plurality of intermediate node elements and/or end node elements, each connected in series and/or parallel with each other and or/with one or more of the network node elements 102, 104A, 104B, 104C, . . . , 104t, to form for example, a torus network topology, ring topology, Clos topology, fat tree topology, ad hoc network, etc. Fabric links may be wired (e.g., metal wires, optical fibers, etc.) and/or wireless (e.g., radio). The fabric 106 may include high performance fabric structures and protocols such as Storm Lake 2/Omni-Path Architecture 2 (STL2/OPA2) provided by Intel® Corp.

Root network node 102 and/or network nodes 104A, 104B, 104C, . . . , 104t may each include, but are not limited to, a mobile telephone including, but not limited to, a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.); an Internet of Things (IoT) networked device including, but not limited to, a sensor system that includes a plurality of sensors and/or a sensor node that contains a sensor and is included in a sensor network (wired and/or wireless) that includes a plurality of networked sensor nodes; a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; switch, router, bridge, hub, fabric interconnect, network storage device, network attached device, non-volatile memory (NVM) storage device, etc.

Root network node 102 may include a processor 110, memory 112, a network controller 108 (e.g., network interface card, etc.) and an OS 117. Processor 110 may include one or more processing units (e.g., cores and/or hardware threads) 111A, . . . , 111n. For example, at least one processing unit may correspond to a graphical processing unit (GPU), such as those provided by Intel® Corp. For example, processor 110 may correspond to a multi-core general purpose processor, such as those provided by Intel® Corp., e.g., Intel® Xeon®, Intel® Xeon Phi™, etc. In another example, processor 110 may correspond to an application-specific integrated circuit (ASIC), a field programmable gate array (FPGA) such as those provided by Altera® Corp., etc.

Root network node 102 includes collector circuitry 114 and aggregator circuitry 116. Root network node 102 may include one or more address spaces 113A, . . . , 113m, one or more tasks 118A, . . . , 118p and at least one application, e.g., application 119. Root network node 102 may further include address management circuitry 126, selector circuitry 128 and a combined address store 130.

Address management circuitry 126 is configured to manage operations related to identifying and allocating common address ranges for root network node 102 and/or across the plurality of network nodes 104A, . . . , 104t included in symmetric addressing system 100. The memory 112 may host the operating system (OS) 117 and one or more of tasks 118A, . . . , and/or 118p. One or more tasks 118A, . . . , and/or 118p may be related to application 119 and each task may be configured to execute on a respective processing unit 111A, . . . , 111n. For example, application 119 may correspond to a collective application configured to be executed as a plurality of tasks across a plurality of processing units and/or network nodes.

The network nodes 104A, 104B, 104C, . . . , 104t may be similarly configured, at least to a certain extent, and taking network node 104A as an example representative of the group of network nodes 104A, 104B, 104C, . . . , 104t, the network node 104A may include a network controller 124 (e.g., network interface card, etc.), a processor 120 (e.g., multi-core general purpose processor, such as those provided by Intel® Corp., etc., and/or an ASIC and/or FPGA such as those provided by Altera® Corp, etc.) and memory 122. Network node 104A may include one or more address spaces 123A, . . . , 123q, one or more tasks 138A, . . . , 138s and at least one application, e.g., application 139. Network node 104A may further include collector circuitry 134 and aggregator circuitry 136. The processor 120 may include one or more processing units (e.g., cores and/or hardware threads) 121A, . . . , 121r. The memory 122 may host the OS 125 and one or more tasks 138A, . . . , and/or 138s. One or more tasks may be related to application 139 and each task may be configured to execute on a respective processing unit 121A, . . . , 121r. For example, application 139 may correspond to a collective application configured to be executed as a plurality of tasks across a plurality of processing units and/or network nodes. In an embodiment, application 139 may be related to application 119.

Tasks, e.g., tasks 118A, . . . , and/or 118p/or tasks 138A, . . . , and/or 138s may be configured to share data across a plurality of address spaces. Applications, e.g., application 119 and/or 139, and their associated tasks may include, for example, messaging applications used in high performance computing (HPC) environments (e.g., message passing interface (MPI), shared memory (SHMEM), etc.), etc., applications that utilize messaging applications (e.g., genetic sequencing applications, computational fluid dynamics applications, web searching applications), etc.

Root network node 102 and/or each other network node 104A, 104B, 104C, . . . , 104t may communicate with each other, via network fabric 106, using one or more communication protocols. For example, the communication protocol may be an Ethernet communications protocol capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard," published in March, 2002 and/or later versions of this standard, for example, the IEEE 802.3 Standard for Ethernet, published 2012; "IEEE Std 802.3bj™", published 2014, titled: IEEE Standard for Ethernet Amendment 2: Physical Layer Specifications and Management Parameters for 100 Gb/s Operation Over Backplanes and Copper Cables; "IEEE P802.3by™"/D0.1, titled: Draft Standard for Ethernet Amendment: Media Access Control Parameters, Physical Layers and Management Parameters for 25 Gb/s Operation; etc.

In another example, the communications protocol may be a custom and/or proprietary communications protocol, for example, the STL2/OPA2 (Storm Lake 2/Omni-Path Architecture 2) protocol provided by Intel® Corp. The custom and/or proprietary communications protocol may comply and/or be compatible with an OpenFabrics Alliance (OFA) OpenFabrics Interface (OFI) and/or OpenFabrics Enterprise Distribution (OFED™)/OpenFabrics Software.

Of course, different and/or after-developed communication protocols are equally contemplated herein.

Symmetric addressing operations of symmetric addressing system 100 may be triggered by launch of a task, e.g., task 118A associated with application 119, and/or may be triggered during execution of the task 118A. For example, root network node 102 and/or each other network node 104A, 104B, 104C, . . . , 104t may be configured to execute a respective task, e.g., task 118A of root network node 102 and/or task 138A of network node 104A. In another example, a first subset of network nodes may be configured to execute one or more tasks associated with a first application and a second subset of network nodes may be configured to execute one or more tasks associated with a second application. The tasks may be executed in parallel on at least one network node and may share data, thus providing parallel processing across a plurality of processing units and/or a plurality of network nodes 102 and/or 104A, 104B, 104C, . . . , and/or 104t.

Each task may be provided an address space by a corresponding OS when the task is launched. In one example, the address space may be a physical address space allocated in memory 112, 122. In another example, the address space may be a virtual address space. A virtual address that is allocated from the perspective of a task may or may not be actually allocated in physical memory 112, 122. In other words, an address range may or may not be backed by physical memory. For example, a range of addresses may be reserved without allocating physical memory. For example, 1 gigabyte of an address range may be allocated without physical memory being allocated. As long as no physical memory is allocated the address range may not be used store data. Allocating the address range without allocating physical memory may be used to allocate an address range whether or not physical memory is currently available, and to then allocate the physical memory later, provided there is enough free memory at that time. Thus, physical memory 112, 122 may or may not actually be allocated when address ranges are allocated.

For example, an allocated address range may be used as a building block for other operations, and in doing so may improve those derived operations. Some systems may include collective operations so that when a first task performs a collective operation, a group of related tasks may also perform the operation. For example, if each task has a variable X, then collective increment of X means all of the associated tasks are configured to increment X.

Such systems may include collective memory allocation. In other words, if one task calls an allocator to locally allocate 10 megabytes, then all the associated tasks may call the allocator to locally allocate 10 megabytes. For example, a region (e.g., an address range of size 1 gigabyte) may be pre-allocated and an associated starting address may be saved locally in each task in a variable ALLOC_BASE. A request for 10 megabytes may then allocate 10 megabytes of physical memory, map it in to the task at the address in ALLOC_BASE, return the value in ALLOC_BASE as the start address of the new allocation, and may also increment ALLOC_BASE by 10 megabytes. Since all of the associated tasks had the same starting address in ALLOC_BASE, all of the associated tasks see their memory allocated at the same address. Since the associated tasks all incremented their local variable ALLOC_BASE by the same amount (10 megabytes), the associated tasks may then have the same incremented value in their local variable ALLOC_BASE.

Because the system pre-allocated 1 gigabyte of address space (i.e., much more than the requested size), a sequence of collective memory allocation operations, e.g., 10 megabytes, then 20, then 15, etc., may all proceed as described above. Thus, each collective-allocated memory region is allocated at the same address in all tasks, e.g., all of the 10 megabyte regions from the first call are at the same address A; all of the 20 megabyte regions from the second call are at the same address B; all of the 15 megabyte regions from the third call are at the same address C; and so on. A system using such an approach may perform many collective allocation operations and achieve consistent addressing across the plurality of tasks and associated address spaces without additional communication between the tasks beyond the communication in the initial setup of the 1 gigabyte range.

In some situations, it may be beneficial for at least some of the tasks executing on network nodes 102 and/or 104A, 104B, 104C, . . . , 104t to utilize a common range of addresses in a corresponding address space, virtual and/or physical. For example, utilizing common addresses may facilitate remote direct memory access (RDMA) operations. Address management circuitry 126 may be configured to manage identification of available address ranges, identification of common available address ranges and selection of one or more common available address ranges. Identification of available local address ranges may be performed by each network node 102 and/or 104A, 104B, 104C, . . . , 104t and at least some of the network nodes 102 and/or 104A, 104B, 104C, . . . , and/or 104t may be configured to combine, i.e., aggregate, individual local memory address ranges, as described herein.

In operation, a plurality of tasks may participate in symmetric addressing operations. In an embodiment, one network node, e.g., root network node 102, may participate in symmetric addressing operations. In another embodiment, a plurality of network nodes, e.g., root network node 102 and one or more of network nodes 104A, 104B, 104C, . . . , and/or 104t, may participate in symmetric addressing operations. Thus, as used herein "participant" corresponds to a task and/or a network node (including root network node 102) that is configured to perform one or more symmetric addressing operations, as described herein. For example, each task participant may include collector circuitry, e.g., collector circuitry 114, 134. One or more task participant may further include aggregator circuitry, e.g., aggregator circuitry 116, 136. Thus symmetric addressing operations may be performed by one network node, e.g., root network node 102, or a plurality of network nodes 102 and 104A, 104B, 104C, . . . , and/or 104t. Address range data may then be aggregated across a plurality of tasks in one network node or a plurality of tasks distributed across a plurality of network nodes.

Symmetric addressing operations may be initiated in response to a task launch associated with a corresponding application. For example, each task may be configured to initiate a memory availability process at start up, e.g., as part of set up operations. Symmetric addressing operations may be initiated during execution of a task. For example, the memory availability operations may be initiated in response to a request by a task to allocate memory. In another example, address management circuitry 126 may be configured to provide a memory availability request to one or more participants, i.e., tasks and/or network node(s). The memory availability request may be provided in response to a request to launch an application, e.g., application 119, in response to a request to launch an associated task, e.g., task 118A, and/or may be provided during execution of the task, e.g., in response to a memory allocation request. The address management circuitry 126 may be further configured to provide the memory availability request if a prior request to the participant(s) does not result in a usable common address range, as described herein.

In some situations, one or more participants, i.e., tasks and/or network nodes, may be delayed in providing address range data. For example, if one task is delayed and the other tasks are waiting for all tasks, then the process may be delayed, and the distribution of memory range(s) may be delayed. In some embodiments, one or more applications may tolerate some delays, but large delays may be treated as a system failure.

In another embodiment, an application or the system may be configured to tolerate late participants, e.g., tasks, by dropping them from consideration and going on without them. When address range data associated with a delayed task arrives, the task may discover that the symmetric addressing process has selected a range which is allocated, i.e., unavailable, in the late task. There may be scenarios when a late task can still participate even without a corresponding address range, but the cost of participation may be higher, e.g., extra costs for all messages to and from late tasks with the corresponding address range unavailable.

A single allocation request may include one or more requests for address range allocations of one or more sizes. For example, the setup of a heap with P pools may include a single allocation request for P address ranges, rather than using P separate requests, each for one address range. A heap memory allocator may maintain several memory pools, where each pool is used to satisfy a different range of sizes of allocation request. For example, one pool may be maintained for sizes up to 16 bytes, another pool may be maintained for sizes 17-48 bytes, and so on. The heap allocator may select the size of each pool according to an expected sum of sizes of individual requests in to the given pool. In another scenario, each pool may be sized according to the maximum size which is expected to be in-use at a given time The participant(s) may be configured to identify local available and/or local unavailable address range(s). The local available address range(s) and/or local unavailable address range(s) may be identified by collector circuitry 114 and/or 134. As used herein, "available", associated with an address range, means "unallocated" and/or "free". As used herein, "busy", associated with an address range, means "allocated" and/or "unavailable". For example, each task may be configured to read a respective local virtual address map to identify available address ranges. For example, in the Linux® OS, the local virtual address map of a task may be read from a pseudo-file/proc/$PID/maps, where $PID is replaced by the task's identifier, e.g., identification number. Each line in the resulting pseudo-file may then include a range of addresses that are currently mapped, i.e., are allocated. Of course, different and/or after-developed virtual address map reading utilities and/or instructions are equally contemplated herein. Thus, local allocated and/or unallocated address ranges may be identified by each task and/or network node in parallel with each other task and/or network node. In one example, the tasks may be executing on one network node, e.g., root network node 102. In this example, each participating task 118A, . . . , and/or 118p may include or be configured to access collector circuitry 114. In another example, the tasks may be executing on a plurality of network nodes, e.g., root network node 102 and one or more of network nodes 104A, . . . , 104t. In this example, each participating task 118A, . . . , and/or 118p and/or 138A, . . . , and/or 138s may be configured to access collector circuitry 114, 134.

Aggregator circuitry 116 may then be configured to aggregate, i.e., combine, local address range data for each task 118A, . . . , and/or 118p associated with application 119. One or more participating tasks 118A, . . . , and/or 118p may include or may be configured to access aggregator circuitry 116. Similarly, aggregator circuitry 136 may be configured to aggregate local address range data for each task 138A, . . . , and/or 138s associated with application 139. One or more participating tasks 138A, . . . , 138s may include or may be configured to access aggregator circuitry 136. Aggregator circuitry 116 and/or 136 may be further configured to aggregate local address range data received from one or more other network nodes. For example, aggregator circuitry 136 may be configured to aggregate local address range data received from one or more of network nodes 104B, . . . , 104t. The received local address range data may contain aggregated local address range data for one or more local address spaces and/or tasks executing on a respective network node. In another example, aggregator circuitry 116 may be configured to aggregate aggregated local address range data received from, e.g., network node 104A. As used herein, address range data may include one or more free address ranges, one or more busy address ranges, a union of busy address ranges and/or an intersection of free address ranges. The union of busy address ranges and/or the intersection of free address ranges may then correspond to "combined" address ranges. A common address range may then correspond to at least a portion of an intersection of free address ranges, as described herein.

The aggregator circuitry, e.g., aggregator circuitry 116 and/or 136, may be configured to aggregate address range data generally in parallel. Aggregating address range data generally in parallel is configured to reduce an amount of time associated with aggregating the address range data. In an embodiment, the aggregator circuitry 116 and/or 136 may be configured to implement a reduction, e.g., a reduction tree. A reduction may include a plurality of levels and combining operations may be performed at each level by a respective number of participants.

Each level may be configured to include a respective number of subgroups. In an embodiment, each subgroup may correspond to one or more address spaces included in one network node. The network node may thus include one or more tasks and one or more address spaces. In another embodiment, each subgroup may correspond to a plurality of network nodes. In this embodiment, each network node may then include one or more address spaces and one or more tasks. Each network node may include on the order of ones, tens, hundreds or more of address spaces. For example, one or more network nodes may each include 16 or 17 tasks and a corresponding 16 or 17 address spaces. In another example, one or more network nodes may each include 288 tasks and a corresponding 288 address spaces. In another example, one or more network nodes may include more or fewer tasks than address spaces.

A subgroup of address spaces included in one network node may correspond to a task subgroup and a subgroup of network nodes may correspond to a node subgroup. Each task subgroup and each node subgroup is configured to include an aggregator, e.g., aggregator circuitry 116, 136. Each task subgroup includes a task configured as a subgroup aggregator task and may include a task configured as a partner task. The subgroup aggregator task may include or may be configured to access aggregator circuitry 116, 136. Each node subgroup includes a network node configured as a subgroup aggregator node and may include at least one network node configured as a partner node.

The number of levels and whether a participant (i.e., a task or a network node) is a subgroup aggregator or a partner for a selected level may be set by, for example, address management circuitry 126. For example, for task subgroups, an aggregator for each task subgroup, e.g., aggregator circuitry 116 and/or 136, is configured to aggregate local address range data for each task and/or address space of the corresponding task subgroups. Aggregator circuitry 116 and/or 136 may be configured to implement a reduction when aggregating address range data within the task subgroup and the corresponding network node (i.e., root network node 102 and/or network node 104A). The task subgroup aggregation may include one or more levels, i.e., one or more task levels.

For each node level, each subgroup aggregator node is configured to combine local address range data with address range data received from partner nodes in its respective subgroup. Each partner node in a subgroup is configured to provide local address range data to the subgroup aggregator node. At node levels above a lowest node level, the local address range data provided to the subgroup aggregator node by each partner node may correspond to combined address range data that was combined at a lower node level. Aggregator level(s) below the lowest node level correspond to task level(s). A final node level (i.e., a highest level) may include one subgroup aggregator node, e.g., root network node 102, or one subgroup aggregator node, e.g., root network node 102, and at least one partner node, e.g., network node 104A. At the highest node level, aggregator circuitry 116 may be configured to aggregate local address range data for address spaces 113A, . . . , 113*m* with aggregated address range data received from, e.g., network node 104A. The received aggregated address range data may include aggregated address range data associated with tasks 138A, . . . , 138*s* and/or address spaces 123A, . . . , 123*q*, as well as aggregated address range data from network nodes 104B, . . . , and/or 104*t*.

The total number of levels (task and node) is related to the number of iterations in an aggregation process. Thus, an amount of time associated with aggregating the address range data is related to the number of levels. Utilizing a reduction process for aggregating address range data is configured to reduce an amount of time associated with aggregating the address range data.

For example, the reduction may be a binary reduction. In a binary reduction, each task level is configured to aggregate pairs of address spaces, i.e., each task level may include one or more task subgroups. A respective number of address spaces may each be reduced by one half from task level to task level. Each node level may include one or more node subgroups and each node subgroup is configured to contain a subgroup aggregator node and a partner node. Considering node levels and node subgroups, a respective number of node subgroups, and thus respective number of participating network nodes, may each be reduced by one half from node level to node level. At each node level, a first half of the network nodes may be configured to receive address range data from a second half of the network nodes. The first half of the network nodes may then correspond to subgroup aggregator nodes and the second half of the network nodes may then correspond to partner nodes. A similar description may apply to task subgroups and corresponding address spaces.

Continuing with this example, at a first node level, each partner node is configured to provide local address range data to a respective subgroup aggregator node. At a second node level, the first half of the network nodes from the first node level may be similarly divided into subgroup aggregator nodes and partner nodes. Thus, at the second node level, each partner node is configured to provide combined address range data to a respective second node level subgroup aggregator node. The binary reduction process may continue until one network node contains combined address range data for the plurality of network nodes. The one network node corresponds to a "root" node, e.g., root network node 102. The root network node may correspond to a subgroup aggregator node.

As an illustrative example, a binary reduction may be applied to a system that includes eight network nodes numbered as network nodes 0, 1, . . . , 7. In this example, for ease of illustration, each node includes one address space. It may be appreciated that, in an actual system, the number of address spaces and/or number of network nodes are generally much greater than eight. Eight network nodes (and eight address spaces) are included, in this illustrative example, for ease of illustration. Continuing with the illustrative example, the first level includes the eight network nodes, 0, 1, . . . , 7. (In other words, the first node level corresponds to the first level of the reduction, since, in this example, there is one address space per network node.) A first half of the network nodes may then include network nodes 0, 2, 4 and 6, and a second half of the network nodes may then include network nodes 1, 3, 5 and 7. Thus, in the first level, network nodes 0, 2, 4 and 6 correspond to subgroup aggregator nodes and network nodes 1, 3, 5 and 7 correspond to partner nodes. Subgroup aggregator nodes 0, 2, 4 and 6 are each configured to receive local address range data from respective partner nodes 1, 3, 5 and 7. Each subgroup aggregator node 0, 2, 4 and 6 is configured to combine the local address range data received from the respective partner node 1, 3, 5 and 7 with local address range data for the subgroup aggregator node 0, 2, 4 and 6. Thus, at the completion of the first level of the binary reduction, subgroup aggregator node 0 may include combined address range data for subgroup aggregator node 0 and partner node 1. Similarly, subgroup aggregator node 2 may include combined address range data for subgroup aggregator node 2 and partner node 3, subgroup aggregator node 4 may include combined address range data for subgroup aggregator node 4 and partner node 5 and subgroup aggregator node 6 may include combined address range data for subgroup aggregator node 6 and partner node 7.

In a second level of the binary reduction, network nodes 0 and 4 may correspond to subgroup aggregator nodes and network nodes 2 and 6 may correspond to partner nodes. Thus, each subgroup aggregator node 0 and 4 may be configured to receive combined address range data from respective partner nodes 2 and 6. The subgroup aggregator nodes 0 and 4 are configured to combine the received combined address range data with the subgroup aggregator node address range data. Thus, at the completion of the second level of binary reduction, subgroup aggregator node 0 may include combined address range data for network nodes 0, 1, 2 and 3 and subgroup aggregator node 4 may include combined address range data for network nodes 4, 5, 6 and 7.

In a third level of the binary reduction, network node 0 may correspond to a subgroup aggregator node and network node 4 may correspond to a partner node. Thus, subgroup aggregator node 0 may be configured to receive combined address range data from partner node 4. Subgroup aggregator node 0 may then combine the received combined address range data with the subgroup aggregator node 0 address range data. Thus, at the completion of the third level of binary reduction, subgroup aggregator node 0 may include combined address range data for all of the network nodes 0, 1, 2, . . . , 7. Network node 0 may then correspond to a root node, e.g., root network node 102.

In another example, one or more tasks and a plurality of network nodes may be configured to implement a reduction that is not binary. In other words, each subgroup that includes more than two participants may then include one subgroup aggregator and more than one partner. Increasing the number of participants in a subgroup may increase the complexity of the combining operations while reducing the number of levels and therefore an amount of time associated with aggregating address range data.

The total (i.e., sum of task levels plus node levels) number of levels, L, utilized in aggregating address range data, is related to the number, N, of address spaces and the number, m, of address spaces and/or network nodes included in a subgroup as $L=\log_m(N)$. In this equation, L is rounded up to a nearest integer. Thus, for the binary reduction example that included eight network nodes (and one address space per network node), the number of levels is three (i.e., $\log_2(8)=3$). Similarly, for a binary reduction that includes 1 million address spaces, the number of levels is rounded up to 20 and for a binary reduction that includes 1 billion address spaces, the number of levels is 30 (rounded up). For a three address space and/or network node subgroup configuration and 1 million address spaces total, the number of levels is 13 (rounded up) and for a four address space and/or network node subgroup and 1 million address spaces total, the number of levels is rounded up to ten. In another example, for the three address space and/or network node subgroup configuration and 1 billion address spaces total, the number of levels is 19 and for a four address space and/or network node subgroup and 1 billion address spaces total, the number of levels is 15.

For example, a symmetric addressing system, e.g., system 100, may include 1.5 million address spaces. Such a system may include 90,000 network nodes with 16 or 17 tasks (i.e., one address space per task) per network node. The number of tasks per node may correspond to a number of processing units per node. In another example, again with 1.5 million address spaces, for network nodes that each include a Xeon Phi™ processor with 288 processing units (available from Intel® Corp.), one task per processing unit and one address space per task, the number of network nodes is about 5500. A network node may include as few as one address space or a same number of address spaces as number of tasks. In some embodiments, the number of tasks may correspond to the number of processing units included in the processor.

Figure 2A:
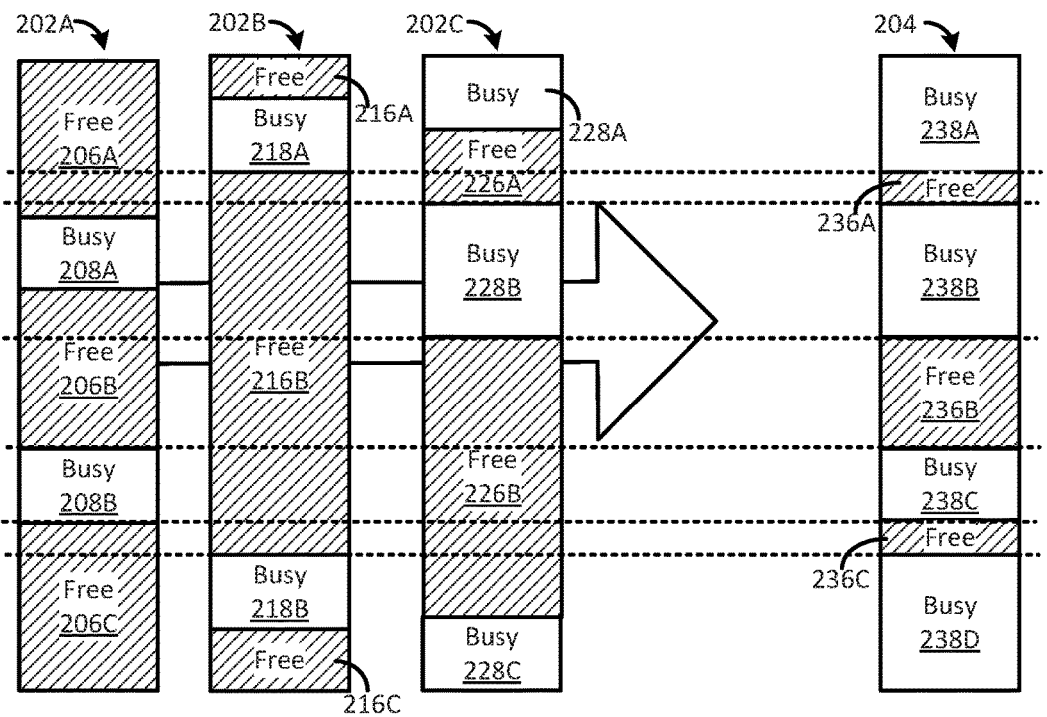
FIGS. 2A and 2B illustrate address range aggregation examples consistent with the present disclosure.
Figure 2B:
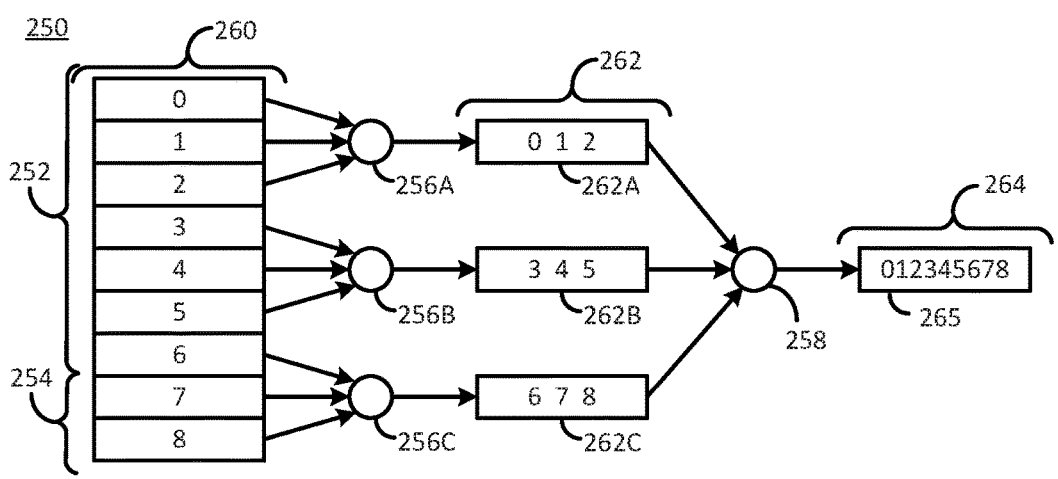

FIGS. 2A and 2B illustrate address range aggregation examples 200, 250 consistent with the present disclosure.

Turning first to FIG. 2A, example 200 includes a plurality of address spaces 202A, 202B and 202C and a combined address space 204. The address spaces may be virtual and/or physical. For example, each address space may correspond to a respective network node, e.g., network nodes 102, 104A and 104B of FIG. 1. In another example, the address spaces may be included in one network node, e.g., root network node 102. In this example 200, each address space includes one or more free regions and one or more busy regions. Each free region corresponds to a free address range and each busy region corresponds to a busy address range. In this example 200, a first address space 202A includes three free regions 206A, 206B and 206C and two busy regions 208A and 208B; a second address space 202B includes three free regions 216A, 216B and 216C, and two busy regions 218A, 218B; a third address space 202C includes two free regions 226A and 226B, and three busy regions 228A, 228B and 228C. The associated free address ranges and/or busy address ranges may be identified by corresponding collector circuitry, e.g., collector circuitry 114 and/or 134, as described herein.

The combined address space 204 is configured to illustrate combined address range data associated with, e.g., root network node 102 or network nodes 102, 104A and 104B. In other words, combined address space 204 is configured to illustrate combined free address ranges and combined busy address ranges for the address spaces 202A, 202B and 202C. The combined address space 204 includes three combined free address ranges 236A, 236B and 236C, and four combined busy address ranges 238A, 238B, 238C and 238D. The three combined free address ranges 236A, 236B and 236C correspond to an intersection of the free address ranges of the three address spaces 202A, 202B and 202C (i.e., the intersection of free regions 206A, 206B, 206C, 216A, 216B, 216C, 226A and 226B). The four combined busy address ranges 238A, 238B, 238C and 238D correspond to a union of the busy address ranges of the three address spaces 202A, 202B and 202C (i.e., the union of busy regions 208A, 208B, 218A, 218B, 228A, 228B and 228C).

Thus, memory address range aggregation example 200 is configured to illustrate one example result of identifying local allocated address ranges and/or unallocated address ranges and aggregating the local address range data into a combined, i.e., composite, busy-free memory map of combined address range data.

Turning now to FIG. 2B, example 250 illustrates a reduction that uses 3-input (i.e., ternary) operations ("ORbusy operations") configured to determine a union of busy address ranges. In this example 250, there are two subsets 252, 254 of address spaces. The first subset includes 7 actual input address spaces, labeled 0, 1, 2, . . . , 6. Each actual input address space 0, 1, 2, . . . , 6 may contain one or more free and/or busy ranges.

The second subset 254 includes two "pseudo" address spaces, labeled 7 and 8. Since, in this example 250, 3-input operations are used and there are only seven actual input address spaces, the two "pseudo" address spaces 7, 8 are included so that the total number of inputs is a whole number multiple of 3. The pseudo input address spaces 7, 8 are free everywhere, i.e., contain no busy address ranges. A first level 260 of the reduction thus includes all of the input address spaces 0, 1, . . . , 8.

A first subgroup aggregation 256 includes three ORbusy operations 256A, 256B, 256C. For example, a first task associated with address space 0, a second task associated with address space 3 and a third task associated with address space 6 may be configured to perform the reduction, i.e., aggregation. The ORbusy operations 256A, 256B, 256C are independent of each other and may thus be performed in parallel (i.e., concurrently) to reduce the 7 actual address spaces and 2 pseudo spaces to three intermediate address spaces 262A, 262B, 262C in a second level 262.

In the second level 262, a first intermediate space 262A contains the ORbusy result of the actual input spaces 0, 1, and 2. A second intermediate space 262B contains the ORbusy result of the actual input spaces 3, 4, and 5. A third intermediate space 262C contains the ORbusy result of the actual input address space 6 and the two pseudo input address spaces 7 and 8. The three intermediate address spaces 262A, 262B, 262C in the second level 262 may then be combined by another 3-input ORbusy operation 258 to produce an aggregation result 265 in a third level 264. For example, the first task associated with address space 0 may be configured to perform the aggregation.

Thus, memory address range aggregation example 250 is configured to illustrate one example of a ternary reduction.

Turning again to FIG. 1, in some situations, the network nodes 104A, 104B, 104C, . . . , and/or 104*t* may be split into one or more subsets. Each subset may include a respective portion of the network nodes and one network node of each subset may correspond to a root node for that subset. The root node is configured to communicate combined address range data for the corresponding subset to the root network node 102. For example, the network nodes included in each subset may be configured to execute one or more tasks associated with a respective application. For example, the network nodes 104A, 104B, 104C, . . . , and/or 104*t* may be split into two subsets with even numbered network nodes included in a first subset and odd numbered network nodes included in a second subset. In another example, all or fewer than all of the network nodes may be grouped into one or more subsets. Thus, at least some network nodes 104A, 104B, 104C, . . . , and/or 104*t* may be configured to aggregate, i.e., combine, address range data received from one or more other network nodes 104A, 104B, 104C, . . . , and/or 104*t*, and one or more network nodes may be configured as root nodes.

Address management circuitry 126 and/or aggregator circuitry 116 is configured to store combined, i.e., aggregated, address range data to combined address store 130. The combined address range data corresponds to a busy-free map. The combined address range data may include aggregated address range data from one or more of tasks 118A, . . . , and/or 118*p* associated with one or more of address spaces 113A, . . . , 113*m*. The combined address range data may further include aggregated address range data from one or more of the network nodes 104A, . . . , and/or 104*t*, e.g., from task(s) 138A, . . . , and/or 138*s* and associated address space(s) 123A, . . . , and/or 123*q*. The combined address range data may include an intersection of free address ranges and/or a union of the busy address ranges.

The selector circuitry 128, is configured to determine whether there is a common address range that is free. Whether there is a common address range that is free may be determined based, at least in part, on the combined address range data stored to combined address store 130. If there is a common address range that is free, address management circuitry 126 may be configured to provide and/or broadcast the selected common address range identifier to the tasks 118A, . . . , 118*p* and to one or more of the network nodes 104A, 104B, 104C, . . . , 104*t*. In response, the tasks 118A, . . . , 118*p* and/or 138A, . . . , 138*s*, e.g., collector circuitry 114 and/or 134, may be configured to release, i.e., deallocate, other common address ranges corresponding to the address range identifiers.

In some situations, the received combined address range data may not contain any suitable free address ranges. For example, local free address ranges for a target group of address spaces may not overlap. In other words, if there is not a common address range that is free, the intersection of free address ranges may be a NULL. If the intersection of address ranges is a NULL and retry is allowed, address management circuitry 126 may then be configured to provide an address range availability request to the tasks and/or network nodes. Retry may be allowed if, for example, a maximum number of tries has not been reached and/or a maximum time has not elapsed. The request for updated address range data may be provided to tasks 118A, . . . , 118*p* and/or network nodes 104A, . . . , 104*t*. If retry is not allowed, the address management circuitry 126 may be configured to signal a common allocation failure. For example, the address management circuitry 126 may be configured to notify (i.e., signal), e.g., a failure handling mechanism and/or a system administrator, of the common allocation failure. If no common range is found, execution may proceed with conventional memory mapping between the tasks and/or network nodes.

In some embodiments, if retry is not allowed, the address management circuitry 126 may be configured to determine whether a partial common address range is enabled. Enabling partial common address range is configured to allow a portion of the address spaces with a selected common address range that is free to use the selected common address range. The one or more address spaces without the selected common address range free may then be configured to use a different common address range and associated tasks may be configured to perform mapping between the selected common address range and the different common address range.

For example, the selector circuitry 128 may be configured to select a common address range that is free for most of the address spaces. In this example, the combined allocation status data may be configured to include a count of the number of address spaces for which a common address range is free or a count of the number of address spaces for which a common address range is busy. A respective count may be associated with each common address range identifier in the combined allocation status data. The selector circuitry 128 may then select a common address range based, at least in part, on the respective counts associated with each common address range identifier.

Continuing with this example, the address management circuitry 126 may then be configured to provide a partial common address range instruction and the selected common address range identifier to, e.g., tasks 118A, . . . , 118*p* and/or network nodes 104A, . . . , 104*t*. Tasks that had the selected common address range locked down may then utilize the selected common address range. Tasks and associated address spaces for which the selected common address range was busy may then utilize a different address range and may be configured to perform mapping between the common address range and the different address range. The tasks and associated address spaces with other common address ranges provisionally (i.e., temporarily) locked down may then release the other common address ranges.

If partial common address range is not enabled, address management circuitry 126 may be configured to signal a common allocation failure, e.g., a common address range failure, to, e.g., a failure handling mechanism and/or a system administrator. Address management circuitry 126 may be further configured to provide a common address range failure to the tasks and/or network nodes. The tasks, e.g., collector circuitry 114 and/or 134 and/or aggregator circuitry 116 and/or 136, may then be configured to release temporarily allocated common memory ranges. The tasks may then be configured to utilize a conventional mapping technique.

If the intersection of free address ranges is not NULL, i.e., if the intersection of free address ranges includes at least one free common address range, selector circuitry 128 is configured to select at least one common address range. Selector circuitry 128 may be configured to select one or more common free address ranges based, at least in part, on a busy-free map, i.e., combined address range data stored to combined address store 130 that includes address range data associated with a plurality of address spaces. Each selected common address range corresponds to a target local address range configured to be common across at least a subset of address spaces, e.g., address spaces 113A, . . . , 113*m*, and/or at least a subset of network nodes 104A, 104B, 104C, . . . , 104*t*. The selector circuitry 128 may be configured to select one or more candidate common address ranges for each allocation request. The number of common address ranges selected may be based, at least in part, on the allocation request(s) that triggered the address range availability operations. For example, if the allocation request included a single large free range, the single large free range may be subdivided into a plurality of smaller common address ranges for provision to the tasks and/or network nodes. In another example, for a heap memory allocator that requested a plurality (e.g., A, B, C) of address range allocations, the plurality of common address ranges (e.g., $R_A$, $R_B$, $R_C$) may be selected. In another example, the address management circuitry 126 may receive a plurality of address range allocation requests from at least a subset of tasks and/or network nodes. The selector circuitry 128 may then be configured to select a plurality of common address ranges, e.g., {{$R_{A0}, R_{A1}, R_{A2}$}, {$R_{B0}, R_{B1}, R_{B3}$} } in response to a request for two ranges {A, B}.

Thus, the selector circuitry 128 may be configured to select one or more candidate common address range(s). The candidate common address range(s) may be associated with one application and associated task(s) or may be associated with a plurality of applications and associated tasks.

In some embodiments, common address ranges may be selected based, at least in part, on whether an adjacent combined address range is free. Selecting common address ranges that are adjacent combined free address ranges is configured to facilitate future allocation of contiguous common address ranges. In other words, a common address range that is smaller than an available combined address range may be selected. The selected common address range may be positioned within the available combined address range so that at least one boundary of the selection common address range is within the available combined address range. As a result, the selected common address range may be adjacent at least one remainder combined free address range.

Common address range data corresponding to the selected common address ranges may then be provided to the at least a subset of tasks 118A, . . . , 118*p* and/or a subset of network nodes 104A, 104B, 104C, . . . , and/or 104*t* by the address management circuitry 126. In one example, the common address range data may include one target common address range. In another example, common address range data may include a plurality of target common address ranges. The plurality of target common address ranges may be related to one application, e.g., application 119, or may be related to a plurality of applications. Thus, one or more target common address ranges may be provided, e.g., broadcast, at a time.

Each task 118A, . . . , 118*p* and/or network node 104A, 104B, 104C, . . . , 104*t* and, e.g., aggregator circuitry 116 and/or 136, is configured to receive the provided common address range data that includes one or more common address ranges. Aggregator circuitry 116, 136 may be configured to determine allocation success or allocation failure for the received common address range data. For example, a task, e.g., task 118A and/or 138A, may be multi-threaded (i.e., may include a plurality of user-level threads), and some other user-level thread in the task may perform an operation that allocates an address range after the local collector circuitry 114 and/or 134 has identified local free address range(s) and before a provided common address range can be allocated. Thus, one or more local allocations may fail. Each task 118A, . . . , 118*p* and/or each network node 104A, 104B, 104C, . . . , 104*t*, e.g., aggregator circuitry 116 and/or 136, may be configured to attempt to allocate the one or more common address ranges included in the common address range data. Each task 118A, . . . , 118*p* and/or each network node 104A, 104B, 104C, . . . , 104*t* may then provide allocation status data corresponding to the allocation success or allocation failure of the one or more common address ranges included in the common address range data. The allocation status data may be provided to address management circuitry 126.

Figure 3:
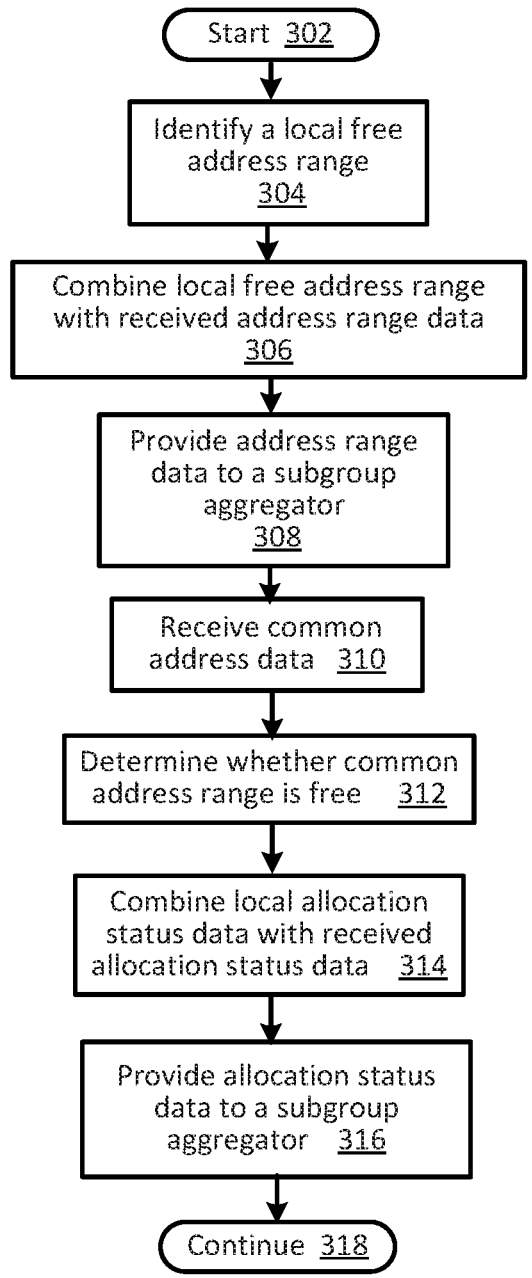
FIG. 3 illustrates a flowchart of network node operations consistent with the present disclosure.

For example, and considering FIG. 2 in combination with FIG. 3, the free and busy address ranges included in address space 202A may be identified and aggregated with other address ranges, as described herein. In this illustrative example, address range 206A may be free before the aggregation operations start, so prior to aggregation the address range 236A is identified as free. In this example, concurrently with the aggregation operations, another user-level thread allocates an address range that corresponds to address range 206A. Thus, by the time address range 236A is selected and communicated to a corresponding task, the address range 206A is no longer free. Thus, common allocation of address range 236A may fail.

Thus, the aggregator circuitry 116 and/or 136 may be configured to determine whether a received common address range is currently free. If the received common address range is currently free, then collector circuitry 114 and/or 134 may be configured to allocate the local common address range, i.e., "lock it down". If the received common address range is not currently free, i.e., is locally allocated, then the aggregator circuitry 116 and/or 136 may be configured to determine whether alternative common address ranges have been provided. For example, common address data may include a plurality of candidate common address ranges that correspond to one allocation request. If alternative common address ranges have been provided, the aggregator circuitry 116 and/or 136 may be configured to determine whether each alternative common address range is currently free. The aggregator circuitry 116 and/or 136 may be further configured to locally allocate each alternative common address range found to be free. Thus, a plurality of common address ranges may be at least provisionally allocated in response to one allocation request. One or more of the provisionally allocated common address ranges may be later released, as described herein.

For example, and again considering FIG. 2A in combination with FIG. 3, the address ranges 236A, 236B and 236C may all be returned. Address range 236A may be indicated as a preferred range. In this illustrative example, concurrently with the aggregation operations, another user-level thread allocates an address range that corresponds to address range 206A so that address range 236A is no longer free. Thus, a task associated with address space 202A may be configured to determine whether address range 236B and/or address range 236C are still free after determining that address range 236A is no longer free. If either address range 236B or address range 236C is free, then one or both may be provisionally allocated, as described herein.

One or more tasks 118A, . . . , 118*p* and, e.g., aggregator circuitry 116, and/or each network node 104A, 104B, 104C, . . . , 104*t*, e.g., aggregator circuitry 136, may be configured to provide local allocation status data to the address management circuitry 126. The local allocation status data may include a local allocation success or failure indicator. For example, the local allocation success or failure indicator may be a Boolean, i.e., a binary value. The local allocation status data may further include a common address range identifier. The common address range identifier may be associated with the local allocation success or failure indicator. For example, for common address range data that includes a plurality of address ranges, each common address range may have a respective associated local allocation success or failure indicator. Similar to aggregation of local address range data, local allocation status data may also be aggregated using a reduction technique, as described herein. For example, the local allocation success or failure indicators associated with a common address range may be aggregated for at least some address spaces 113A, . . . , 113*m* and/or at least some network nodes.

For example, if the local allocation status data includes only the local allocation success or failure indicator, then a combined allocation success or failure indicator may correspond to a logical AND operation of individual success or failure indicators. Continuing with this example, the allocation success indicator may correspond to a logic one and allocation failure indicator may correspond to a logic zero.

Thus, the combined allocation success or failure indicator may correspond to a logic one if all tasks and/or network nodes in a subgroup provide allocation success indicators or the combined allocation success or failure indicator may correspond to a logic zero if any one or more tasks and/or network nodes in a subgroup provide allocation failure indicators. In other words, allocation success corresponds to successful allocation of a target common address range across all address spaces in the subgroup and allocation failure corresponds to an unsuccessful allocation of the target common address range for at least one address space in the subgroup.

In one embodiment, if one or more tasks and/or network node(s) provides an allocation failure indicator, the aggregation of allocation success/failure indicators may be allowed to complete and an aggregated allocation failure indicator may be provided to and/or determined by root network node and, e.g., address management circuitry 126. In another embodiment, if one or more tasks and/or network node(s) provides an allocation failure indicator, each individual allocation failure indicator may be communicated to address management circuitry 126 and the reduction of allocation success/failure indicators may not complete. If the combined allocation indicator corresponds to success, then the allocation of a common address range may be completed.

If a combined allocation indicator corresponds to at least one failure, then address management circuitry 126 may provide a second common address range. The second common address range may be provided to tasks 118A, . . . , 118p, and/or network nodes 104A, . . . , 104t, and/or associated tasks, e.g., tasks 138A, . . . , 138s. Each task and, e.g., collector circuitry 114 and/or 134 and/or aggregator circuitry 116 and/or 136, may be configured to deallocate, i.e., unmap and/or release, the first common address range in each associated address space and to determine whether the second common address range is currently free for each associated address space. The process may be repeated, i.e., may be retried, until the combined allocation status indicator corresponds to success for all address spaces in a target subset or may halt on an indicated condition, such as a predetermined number of tries and/or a predetermined time interval. If the process is halted without successfully globally allocating a common address range, the address management circuitry 126 may be configured to signal, e.g., a failure handling mechanism and/or a system administrator, of a common allocation failure and one or more of the tasks and/or network nodes may be configured to use conventional memory address mapping techniques.

In another example, if the local allocation status data includes a common address range identifier, the local allocation status data may also include a corresponding local allocation success or failure indicator associated with each common address range identifier. For example, the common address range identifier may be an index that corresponds to a location of an associated common address range in a vector that includes a plurality of common address ranges. In another example, the common address range identifier may correspond to an associated common address range. Combined allocation status data may then include a respective combined allocation success or failure indicator associated with each common address range identifier. In other words, if the address management circuitry 126 and/or selector circuitry 128, are configured to provide, e.g., broadcast, a plurality of common address ranges to the tasks 118A, . . . , 118p and/or network nodes 104A, 104B, 104C, . . . , 104t, each task and/or network node, e.g., aggregator circuitry 116 and/or 136, may be configured to return a local allocation success or failure indicator associated with each common address range identifier for each associated address space. Each task 118A, . . . , 118p and/or network node 104A, 104B, 104C, . . . , and/or 104t, e.g., collector circuitry 114 and/or 134, may be further configured to allocate, at least temporarily, the respective common address range associated with each common address range identifier in each associated address space.

Continuing with this example, combined allocation status data may then include a combined allocation success or failure indicator associated with each common address range identifier. The combined allocation success or failure indicator associated with each common address range identifier may then correspond to a logical AND operation of individual success or failure indicators associated with each common address range identifier. The combined allocation status data may be determined using a reduction technique, applied to the allocation success or failure indicators across at least some of the address spaces, as described herein. The combined allocation status data may then be provided and/or transmitted to the address management circuitry 126 by, e.g., aggregator circuitry 116 and/or 136.

In an embodiment, one or more tasks 118A, . . . 118p and collector circuitry 114 and/or aggregator circuitry 116 and possibly tasks 138A, . . . , 138s and collector circuitry 134 and/or aggregator circuitry 136 may be configured to, at least initially, reserve (i.e., "locally allocate") local address range(s) without actually allocating physical memory. Such local allocation is configured to prevent another process, e.g., thread and/or application, from using such locally allocated address range and to thus, increase a likelihood that the address range will be available when actually utilized by the corresponding task, e.g., task 118A. For example, an address range may be reserved by setting the address range explicitly to fault-on-access. In another example, the address range may be reserved by mapping each page in a region to a single page that reads zero but is not writable. Such local allocation may be performed, for example, by an operating system, e.g., OS 117, in response to a request from a task.

Thus, one or more tasks may be configured to utilize a common address range across a plurality of address spaces. Identification and aggregation, i.e., combining, of available address ranges may be performed efficiently, in parallel, by one or more tasks and one or more network nodes. One or more common free address ranges may be selected based, at least in part, on the busy-free map, i.e., combined address range data that includes address range data associated with a plurality of address spaces A finite number of retries is allowed with implementation of conventional mapping if allocation of a common address range is not successful. Thus, utilizing a common address range may be facilitated, as described herein.

FIG. 3 is a flowchart 300 of network node operations according to various embodiments of the present disclosure. In particular, the flowchart 300 illustrates network node common address range operations. The operations may be performed by, for example, network nodes 102 and/or 104A, 104B, 104C, . . . , and/or 104t, tasks 118A, . . . , 118p, tasks 138A, . . . , 138s, collector circuitry 114 and/or 134 and/or aggregator circuitry 116 and/or 136 of FIG. 1.

Operations of this embodiment may begin with start 302. Operation 304 includes identifying a local free address range. For example, at least one local free address range may be identified at a start of execution of a task. In another example, at least one local free address range may be identified during execution of the task. In another example, at least one local free address range may be identified in response to an address range availability request from, e.g., address management circuitry 126. The at least one local free address range may be combined, i.e., aggregated, with received address range data at operation 306. The address range data may be provided to a subgroup aggregator at operation 308. The subgroup aggregator may be a subgroup aggregator task or a subgroup aggregator node. Common address data may be received at operation 310. For example, common address data may be received from, e.g., selector circuitry 128. Whether a common address range is free may be determined at operation 312. Local allocation status data may be combined with received allocation status data at operation 314. The allocation status data may be provided to a subgroup aggregator at operation 316. Program flow may then continue at operation 318.

Thus, address range data may be determined and combined. The address range data may span one or more address spaces and/or one or more network nodes. Whether a common address range is free may be determined and corresponding allocation status data may be provided.

Figure 4:
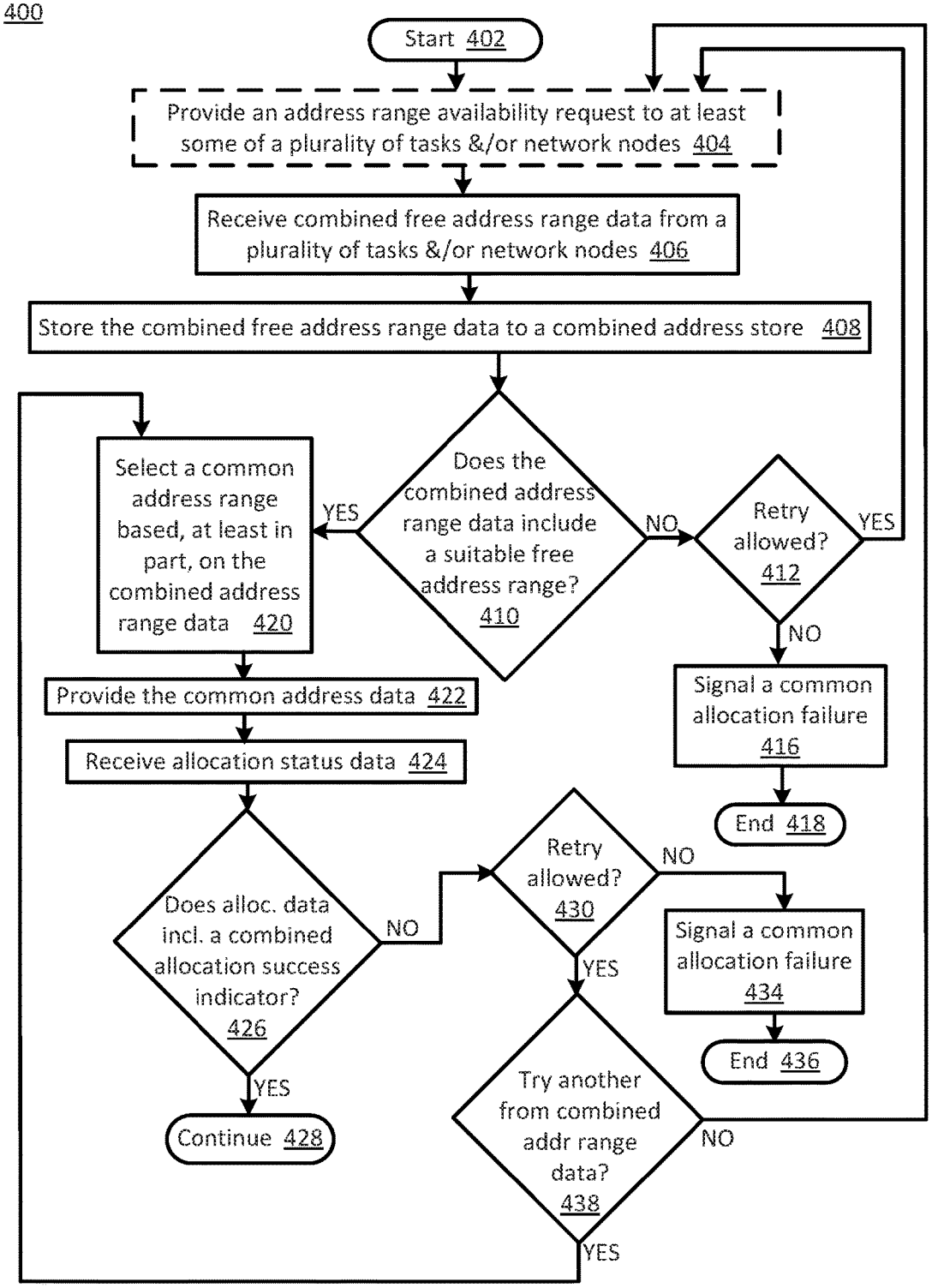
FIG. 4 illustrates a flowchart of root network node operations consistent with the present disclosure.

FIG. 4 is a flowchart 400 of root network node operations according to various embodiments of the present disclosure. In particular, the flowchart 400 illustrates root network node common address range operations. The operations may be performed by, for example, root network node 102, address management circuitry 126 and/or selector circuitry 128 of FIG. 1.

Operations of this embodiment may begin with start 402. In some embodiments, an address range availability request may be provided to at least some of a plurality of tasks and/or at least some of a plurality of network nodes at operation 404. In some embodiments, the address range availability request may not be provided. For example, address range data may be collected in response to a task launch. Combined address range data may be received from a plurality of tasks and/or network nodes at operation 406. For example, the combined address range data may be received from one or more network nodes. In another example, combined address range data may be received from one or more tasks. The combined address range data may be stored to a combined address store at operation 408.

Whether the combined address range data includes a suitable free address range may be determined at operation 410. If the combined address range data does not include a suitable free address range, then whether a retry is allowed may be determined at operation 412. For example, retry may not be allowed if a maximum number of tries and/or a maximum time interval has been exceeded. If retry is not allowed, then a common allocation failure may be signaled at operation 416. Program flow may then end at operation 418. If retry is allowed, then program flow may proceed to operation 404 and operations 404, 406, 408 and 410 may be repeated.

If the combined address range data includes a free address range, then a common address range may be selected based, at least in part, on the combined address range data, at operation 420. The common address data may then be provided at operation 422. For example, the common address data may be provided to a plurality of tasks. Allocation status data may be received at operation 424. For example, the allocation status data may be received from a task and/or a network node and may be related to one or more address spaces. Whether the allocation data includes a combined allocation success indicator may be determined at operation 426. If the allocation data includes a combined allocation success indicator, program flow may continue at operation 428. If the allocation data does not include a combined allocation success indicator, i.e., includes a combined allocation failure indicator, then whether retry is allowed may be determined at operation 430. If retry is allowed, then whether another common address range from combined address range data may be tried may be determined at operation 438. If another common address range from combined address range data may be tried, then program flow may proceed to operation 420 and operations 420, 422, 424 and 426 may be repeated. If another common address range from combined address range data may not be tried, then program flow may proceed to operation 404. If retry is not allowed, then a common allocation failure may be signaled at operation 434. Program flow may then ended operation 436.

Thus, common address data may be determined based, at least in part, on combined address range data for one or more address spaces distributed across one or more network nodes. Allocation of a common address range may be attempted and combined allocation status data may be received. A common allocation failure may be communicated if common allocation fails after a maximum number of tries and/or a maximum time interval is exceeded.

While the flowcharts of FIGS. 3 through 4 illustrate operations according various embodiments, it is to be understood that not all of the operations depicted in FIGS. 3 through 4 are necessary for other embodiments. In addition, it is fully contemplated herein that in other embodiments of the present disclosure, the operations depicted in FIGS. 3 and/or 4 and/or other operations described herein may be combined in a manner not specifically shown in any of the drawings, and such embodiments may include less or more operations than are illustrated in FIGS. 3 through 4. Thus, claims directed to features and/or operations that are not exactly shown in one drawing are deemed within the scope and content of the present disclosure.

The foregoing includes example system architectures and methodologies. Modifications to the present disclosure are possible. The processor 110, 120 may include one or more processor cores and may be configured to execute system software. System software may include, for example, operating system code (e.g., OS kernel code) and local area network (LAN) driver code. LAN driver code may be configured to control, at least in part, the operation of the network controller 108, 124. System memory may include I/O memory buffers configured to store one or more data packets that are to be transmitted by, or received by, network controller 108, 124. Chipset circuitry may generally include "North Bridge" circuitry (not shown) to control communication between the processor, network controller 108, 124 and system memory 112, 122.

The operating systems 117, 125 are configured to manage system resources and control tasks that are run on, e.g., root network node 102 and/or other network nodes 104A, 104B, 104C, . . . , 104*t*. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised of a dedicated subsystem such as, for example, a TCP offload engine and/or network controller 108, 124. The TCP offload engine circuitry may be configured to provide, for example, packet transport, packet segmentation, packet reassembly, error checking, transmission acknowledgements, transmission retries, etc., without the need for host CPU and/or software involvement.

The memory 112, 122 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable storage devices.

Embodiments of the operations described herein may be implemented in a system that includes at least one tangible computer-readable storage device having stored thereon, individually or in combination, instructions that when executed by one or more processors perform the operations. The one or more processors may include, for example, a processing unit and/or programmable circuitry in the network controller 108, 124, system processor 110, 120 and/or other processing unit or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage device suitable for storing electronic instructions.

In some embodiments, a hardware description language (HDL) may be used to specify circuit and/or logic implementation(s) for the various circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processors 110, 120 executing code and/or instructions sets (e.g., software, firmware, etc.) corresponding to the functionality described herein, thus transforming a general-purpose processor into a specific-purpose processing environment to perform one or more of the operations described herein. In some embodiments, the network controller 108, 124 may be embodied as a stand-alone integrated circuit or may be incorporated as one of several components on an integrated circuit. In some embodiments, the various components and circuitry of the network controller 108, 124 or other systems may be combined in a system-on-a-chip (SoC) architecture.

EXAMPLES

Examples of the present disclosure include subject material such as a method, means for performing acts of the method, a device, or of an apparatus or system related to symmetric addressing, as discussed below.

Example 1

According to this example, there is provided an apparatus. The apparatus includes a processor; a memory, an application, collector circuitry and aggregator circuitry. The memory is to store one or more tasks. The application is associated with the one or more tasks. The collector circuitry is to identify a local free address range in at least one address space. The aggregator circuitry is to provide address range data to a subgroup aggregator. The provided address range data includes at least one local free address range.

Example 2

This example includes the elements of example 1, wherein the collector circuitry is further to determine whether a common address range is free and the aggregator circuitry is further to provide allocation status data to the subgroup aggregator, the allocation status data determined based, at least in part, on a result of the determination whether the common address range is free.

Example 3

This example includes the elements of example 1, wherein the aggregator circuitry is further to combine the at least one local free address range with received address range data to yield the provided address range data.

Example 4

This example includes the elements according to any one of examples 1 through 3, wherein the collector circuitry is to identify a plurality of local free address ranges.

Example 5

This example includes the elements according to any one of examples 1 through 3, wherein the address range data includes one or more of a free address range, a busy address range, a union of busy address ranges and/or an intersection of free address ranges.

Example 6

This example includes the elements of example 2, wherein the collector circuitry is to determine whether a plurality of common address ranges are free and to allocate one or more free common address ranges.

Example 7

This example includes the elements of example 2, wherein the aggregator circuitry is further to combine the allocation status data with received allocation status data to yield the provided allocation status data.

Example 8

This example includes the elements according to any one of examples 1 through 3, wherein the subgroup aggregator corresponds to at least one of a subgroup aggregator node and/or a subgroup aggregator task.

Example 9

This example includes the elements according to any one of examples 1 through 3, wherein the aggregator circuitry is to implement a reduction.

Example 10

This example includes the elements according to any one of examples 1 through 3, further including a plurality of tasks.

Example 11

According to this example, there is provided a method. The method includes identifying, by collector circuitry, a local free address range in at least one address space; and providing, by aggregator circuitry, address range data to a subgroup aggregator, the provided address range data including at least one local free address range.

Example 12

This example includes the elements of example 11, further including: determining, by the collector circuitry, whether a common address range is free; and providing, by the aggregator circuitry, allocation status data to the subgroup aggregator, the allocation status data determined based, at least in part, on a result of the determination whether the common address range is free.

Example 13

This example includes the elements of example 11, further including: combining, by the aggregator circuitry, the at least one local free address range with received address range data to yield the provided address range data.

Example 14

This example includes the elements of example 11, wherein the collector circuitry is to identify a plurality of local free address ranges.

Example 15

This example includes the elements of example 11, wherein the address range data includes one or more of a free address range, a busy address range, a union of busy address ranges and/or an intersection of free address ranges.

Example 16

This example includes the elements of example 12, further including: determining, by the collector circuitry, whether a plurality of common address ranges are free and allocating, by the collector circuitry, one or more free common address ranges.

Example 17

This example includes the elements of example 12, further including: combining, by the aggregator circuitry, the allocation status data with received allocation status data to yield the provided allocation status data.

Example 18

This example includes the elements of example 11, wherein the subgroup aggregator corresponds to at least one of a subgroup aggregator node and/or a subgroup aggregator task.

Example 19

This example includes the elements of example 11, wherein the aggregator circuitry is to implement a reduction.

Example 20

This example includes the elements of example 11, further including providing, by address management circuitry, an address range availability request at least one of in response to launch of a task and/or during execution of the task, the at least one local free address range identified in response to the request.

Example 21

This example includes the elements of example 11, further including: receiving, by address management circuitry, combined address range data from at least one task and storing, by the address management circuitry, the combined address range data to a combined address store.

Example 22

This example includes the elements of example 21, further including: determining, by the address management circuitry, whether the combined address range data contains any suitable free address ranges and signaling, by the address management circuitry, a common allocation failure if the combined address range data does not contain any suitable free address ranges.

Example 23

This example includes the elements of example 11, further including coupling, by a network fabric, a root network node and at least one other network node.

Example 24

This example includes the elements of example 21, further including: selecting, by selector circuitry, a common address range based, at least in part, on the stored combined address range data and providing, by the address management circuitry, common address data to at least one of a task and/or a network node.

Example 25

This example includes the elements of example 24, wherein the common address range is adjacent a combined free address range.

Example 26

This example includes the elements of example 21, further including selecting, by selector circuitry, a plurality of common address ranges based, at least in part, on the stored combined address range data and providing, by the address management circuitry, common address data to at least one of a task and/or a network node.

Example 27

This example includes the elements of example 24, further including selecting, by the selector circuitry, another common address range in response to receiving combined allocation status data containing at least one failure indicator.

Example 28

This example includes the elements of example 24, wherein the address management circuitry is to signal a common allocation failure in response to receiving combined allocation status data containing at least one failure indicator and a retry is not allowed.

Example 29

According to this example, there is provided a system. The system includes a root network node including address management circuitry; at least one other network node; and a network fabric to couple the root network node and the at least one other network node. Each network node includes a processor; a memory, an application, collector circuitry and aggregator circuitry. The memory is to store one or more tasks. The application is associated with the one or more tasks. The collector circuitry is to identify a local free address range in at least one address space. The aggregator circuitry is to provide address range data to a subgroup aggregator, the provided address range data including at least one local free address range.

Example 30

This example includes the elements of example 29, wherein the collector circuitry is further to determine whether a common address range is free and the aggregator circuitry is further to provide allocation status data to the subgroup aggregator, the allocation status data determined based, at least in part, on a result of the determination whether the common address range is free.

Example 31

This example includes the elements of example 29, wherein the aggregator circuitry is further to combine the at least one local free address range with received address range data to yield the provided address range data.

Example 32

This example includes the elements according to any one of examples 29 through 31, wherein the collector circuitry is to identify a plurality of local free address ranges.

Example 33

This example includes the elements according to any one of examples 29 through 31, wherein the address range data includes one or more of a free address range, a busy address range, a union of busy address ranges and/or an intersection of free address ranges.

Example 34

This example includes the elements of example 30, wherein the collector circuitry is to determine whether a plurality of common address ranges are free and to allocate one or more free common address ranges.

Example 35

This example includes the elements of example 30, wherein the aggregator circuitry is further to combine the allocation status data with received allocation status data to yield the provided allocation status data.

Example 36

This example includes the elements according to any one of examples 29 through 31, wherein the subgroup aggregator corresponds to at least one of a subgroup aggregator node and/or a subgroup aggregator task.

Example 37

This example includes the elements according to any one of examples 29 through 31, wherein the aggregator circuitry is to implement a reduction.

Example 38

This example includes the elements according to any one of examples 29 through 31, wherein the address management circuitry is to provide an address range availability request at least one of in response to launch of a task and/or during execution of the task.

Example 39

This example includes the elements according to any one of examples 29 through 31, wherein the address management circuitry is to receive combined address range data from at least one task and to store the combined address range data to a combined address store.

Example 40

This example includes the elements of example 39, wherein the address management circuitry is to determine whether the combined address range data contains any suitable free address ranges and to signal a common allocation failure if the combined address range data does not contain any suitable free address ranges.

Example 41

This example includes the elements according to any one of examples 29 through 31, wherein each network node includes a plurality of address spaces.

Example 42

This example includes the elements of example 39, wherein the root network node further includes selector circuitry to select a common address range based, at least in part, on the stored combined address range data, and the address management circuitry is to provide common address range data to at least one of the one or more tasks and/or the at least one other network nodes.

Example 43

This example includes the elements of example 42, wherein the common address range is adjacent a combined free address range.

Example 44

This example includes the elements according to any one of examples 29 through 31, wherein each processor includes a plurality of processing units.

Example 45

This example includes the elements of example 42, wherein the selector circuitry is to select another common address range in response to receiving combined allocation status data containing at least one failure indicator.

Example 46

This example includes the elements of example 42, wherein the address management circuitry is to signal a common allocation failure in response to receiving combined allocation status data containing at least one failure indicator and a retry is not allowed.

Example 47

This example includes the elements according to any one of examples 29 through 31, wherein the network fabric complies and/or is compatible with Storm Lake 2/Omni-Path Architecture 2 (STL2/OPA2) provided by Intel® Corp.

Example 48

According to this example, there is provided a computer readable storage device. The computer readable storage device has stored thereon instructions that when executed by one or more processors result in the following operations including identifying a local free address range in at least one address space; and providing address range data to a subgroup aggregator, the provided address range data including at least one local free address range.

Example 49

This example includes the elements of example 48, wherein the instructions that when executed by one or more processors results in the following additional operations including: determining whether a common address range is free; and providing allocation status data to the subgroup aggregator, the allocation status data determined based, at least in part, on a result of the determination whether the common address range is free.

Example 50

This example includes the elements of example 48, wherein the instructions that when executed by one or more processors results in the following additional operations including: combining the at least one local free address range with received address range data to yield the provided address range data.

Example 51

This example includes the elements according to any one of examples 48 through 50, wherein the instructions that when executed by one or more processors results in the following additional operations including identifying a plurality of local free address ranges.

Example 52

This example includes the elements according to any one of examples 48 through 50, wherein the address range data includes one or more of a free address range, a busy address range, a union of busy address ranges and/or an intersection of free address ranges.

Example 53

This example includes the elements of example 49, wherein the instructions that when executed by one or more processors results in the following additional operations including: determining whether a plurality of common address ranges are free; and allocating one or more free common address ranges.

Example 54

This example includes the elements of example 49, wherein the instructions that when executed by one or more processors results in the following additional operations including: combining the allocation status data with received allocation status data to yield the provided allocation status data.

Example 55

This example includes the elements of example 48, wherein the subgroup aggregator corresponds to at least one of a subgroup aggregator node and/or a subgroup aggregator task.

Example 56

This example includes the elements according to any one of examples 48 through 50, wherein the instructions that when executed by one or more processors results in the following additional operations including implementing a reduction.

Example 57

This example includes the elements according to any one of examples 48 through 50, wherein the instructions that when executed by one or more processors results in the following additional operations including providing an address range availability request at least one of in response to launch of a task and/or during execution of the task, the at least one local free address range identified in response to the request.

Example 58

This example includes the elements according to any one of examples 48 through 50, wherein the instructions that when executed by one or more processors results in the following additional operations including: receiving combined address range data from at least one task; and storing the combined address range data to a combined address store.

Example 59

This example includes the elements of example 58, wherein the instructions that when executed by one or more processors results in the following additional operations including: determining whether the combined address range data contains any suitable free address ranges and signaling a common allocation failure if the combined address range data does not contain any suitable free address ranges.

Example 60

This example includes the elements according to any one of examples 48 through 50, wherein the instructions that when executed by one or more processors results in the following additional operations including coupling, by a network fabric, a root network node and at least one other network node.

Example 61

This example includes the elements of example 58, wherein the instructions that when executed by one or more processors results in the following additional operations including: selecting a common address range based, at least in part, on the stored combined address range data; and providing common address data to at least one of a task and/or a network node.

Example 62

This example includes the elements of example 61, wherein the common address range is adjacent a combined free address range.

Example 63

This example includes the elements of example 58, wherein the instructions that when executed by one or more processors results in the following additional operations including: selecting a plurality of common address ranges based, at least in part, on the stored combined address range data; and providing common address data to at least one of a task and/or a network node.

Example 64

This example includes the elements of example 61, wherein the instructions that when executed by one or more processors results in the following additional operations including: selecting another common address range in response to receiving combined allocation status data containing at least one failure indicator.

Example 65

This example includes the elements of example 61, wherein the instructions that when executed by one or more processors results in the following additional operations including: signaling a common allocation failure in response to receiving combined allocation status data containing at least one failure indicator and a retry is not allowed.

Example 66

According to this example, there is provided a device. The device includes means for identifying, by collector circuitry, a local free address range in at least one address space; and means for providing, by aggregator circuitry, address range data to a subgroup aggregator, the provided address range data including at least one local free address range.

Example 67

This example includes the elements of example 66, further including: means for determining, by the collector circuitry, whether a common address range is free; and means for providing, by the aggregator circuitry, allocation status data to the subgroup aggregator, the allocation status data determined based, at least in part, on a result of the determination whether the common address range is free.

Example 68

This example includes the elements of example 66, further including: means for combining, by the aggregator circuitry, the at least one local free address range with received address range data to yield the provided address range data.

Example 69

This example includes the elements according to any one of examples 66 through 68, wherein the collector circuitry is to identify a plurality of local free address ranges.

Example 70

This example includes the elements according to any one of examples 66 through 68, wherein the address range data includes one or more of a free address range, a busy address range, a union of busy address ranges and/or an intersection of free address ranges.

Example 71

This example includes the elements of example 67, further including: means for determining, by the collector circuitry, whether a plurality of common address ranges are free and means for allocating, by the collector circuitry, one or more free common address ranges.

Example 72

This example includes the elements of example 67, further including: means for combining, by the aggregator circuitry, the allocation status data with received allocation status data to yield the provided allocation status data.

Example 73

This example includes the elements according to any one of examples 66 through 68, wherein the subgroup aggregator corresponds to at least one of a subgroup aggregator node and/or a subgroup aggregator task.

Example 74

This example includes the elements according to any one of examples 66 through 68, wherein the aggregator circuitry is to implement a reduction.

Example 75

This example includes the elements according to any one of examples 66 through 68, further including means for providing, by address management circuitry, an address range availability request at least one of in response to launch of a task and/or during execution of the task, the at least one local free address range identified in response to the request.

Example 76

This example includes the elements according to any one of examples 66 through 68, further including: means for receiving, by address management circuitry, combined address range data from at least one task and means for storing, by the address management circuitry, the combined address range data to a combined address store.

Example 77

This example includes the elements of example 76, further including: means for determining, by the address management circuitry, whether the combined address range data contains any suitable free address ranges and means for signaling, by the address management circuitry, a common allocation failure if the combined address range data does not contain any suitable free address ranges.

Example 78

This example includes the elements according to any one of examples 66 through 68, further including means for coupling, by a network fabric, a root network node and at least one other network node.

Example 79

This example includes the elements of example 76, further including: means for selecting, by selector circuitry, a common address range based, at least in part, on the stored combined address range data and means for providing, by the address management circuitry, common address data to at least one of a task and/or a network node.

Example 80

This example includes the elements of example 79, wherein the common address range is adjacent a combined free address range.

Example 81

This example includes the elements of example 76, further including means for selecting, by selector circuitry, a plurality of common address ranges based, at least in part, on the stored combined address range data and means for providing, by the address management circuitry, common address data to at least one of a task and/or a network node.

Example 82

This example includes the elements of example 79, further including means for selecting, by the selector circuitry, another common address range in response to receiving combined allocation status data containing at least one failure indicator.

Example 83

This example includes the elements of example 79, wherein the address management circuitry is to signal a common allocation failure in response to receiving combined allocation status data containing at least one failure indicator and a retry is not allowed.

Example 84

According to this example, there is provided a system. The system includes at least one device arranged to perform the method according to any one of examples 11 through 28.

Example 85

According to this example, there is provided a device. The device includes means to perform the method according to any one of examples 11 through 28.

Example 86

According to this example, there is provided a computer readable storage device. The computer readable storage device has stored thereon instructions that when executed by one or more processors result in the following operations including: the method according to any one of examples 11 through 28.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:
1. An apparatus comprising:
a processor;
a memory to store one or more tasks;
an application associated with the one or more tasks;
collector circuitry to identify a local free address range in at least one address space; and aggregator circuitry to provide address range data to a subgroup aggregator, the provided address range data comprising at least one local free address range;
wherein:
the apparatus is a first network node; the collector circuitry is further to determine whether a common address range is free;
the aggregator circuitry is further to combine local allocation status data of the first network node with received address range data of at least one other network node to produce combined allocation status data, and to provide the combined allocation status data to the subgroup aggregator; and
the local allocation status data is determined based, at least in part, on a result of the determination whether the common address range is free;
wherein the aggregator circuitry is further to combine the at least one local free address range with received address range data to yield the provided address range data.

2. The apparatus of claim 1, wherein the aggregator circuitry is further to implement a reduction when aggregating address range data within a task subgroup and a corresponding network node.

3. The apparatus of claim 2, wherein the reduction is a binary reduction or a ternary reduction.

4. The apparatus of claim 1, wherein the collector circuitry is to determine whether a plurality of common address ranges are free and to allocate one or more free common address ranges.

5. The apparatus of claim 1, wherein the subgroup aggregator corresponds to at least one of a subgroup aggregator node and/or a subgroup aggregator task.

6. A method comprising:
identifying, by collector circuitry of a first network node, a local free address range in at least one address space;
providing, by aggregator circuitry of the first network node, address range data to a subgroup aggregator, the provided address range data comprising at least one local free address range;
determining, with the collector circuitry, whether a common address range is free;
generating, with the aggregator circuitry, combined allocation status data at least in part by combining local allocation status data of the first network node with received address range data of at least one other network node; and
providing, with the aggregator circuitry, the combined allocation status data to the subgroup aggregator;
wherein the local allocation status data is determined based at least in part on a result of the determining whether the common address range is free;
wherein the aggregator circuitry further combining the at least one local free address range with received address range data to yield the provided address range data.

7. The method of claim 6, further comprising implementing, with the aggregator circuitry, a reduction when aggregating address range data within a task subgroup and a corresponding network node.

8. The method of claim 7, wherein the reduction is a binary reduction or a ternary reduction.

9. The method of claim 6, further comprising: determining, by the collector circuitry, whether a plurality of common address ranges are free and allocating, by the collector circuitry, one or more free common address ranges.

10. The method of claim 6, wherein the subgroup aggregator corresponds to at least one of a subgroup aggregator node and/or a subgroup aggregator task.

11. The method of claim 6, further comprising: receiving, by address management circuitry, combined address range data from at least one task and storing, by the address management circuitry, the combined address range data to a combined address store.

12. The method of claim 11, further comprising: determining, by the address management circuitry, whether the combined address range data contains any suitable free address ranges and signaling, by the address management circuitry, a common allocation failure if the combined address range data does not contain any suitable free address ranges.

13. A system comprising:
a first network node comprising address management circuitry;
at least one other network node; and
a network fabric to couple the first network node and the at least one other network node,
wherein the first network node comprise;
a processor;
a memory to store one or more tasks;
an application associated with the one or more tasks;
collector circuitry to identify a local free address range in at least one address space; and
aggregator circuitry to provide address range data to a subgroup aggregator, the provided address range data comprising at least one local free address range;
wherein:
the collector circuitry is further to determine whether a common address range is free;
the aggregator circuitry is further to combine local allocation status data of the first network node with received address range data of the at least one other network node to produce combined allocation status data, and to provide the combined allocation status data to the subgroup aggregator; and
the local allocation status data is determined based, at least in part, on a result of the determination whether the common address range is free;
wherein the aggregator circuitry is further to combine the at least one local free address range with received address range data to yield the provided address range data.

14. The system of claim 13, wherein the aggregator circuitry is further to implement a reduction when aggregating address range data within a task subgroup and a corresponding network node.

15. The system of claim 14, wherein the reduction is a binary reduction or a ternary reduction.

16. The system of claim 13, wherein the collector circuitry is to determine whether a plurality of common address ranges are free and to allocate one or more free common address ranges.

17. The system of claim 13, wherein the subgroup aggregator corresponds to at least one of a subgroup aggregator node and/or a subgroup aggregator task.

18. The system of claim 13, wherein the address management circuitry is to receive combined address range data from at least one task and to store the combined address range data to a combined address store.

19. The system of claim 18, wherein the address management circuitry is to determine whether the combined address range data contains any suitable free address ranges and to signal a common allocation failure if the combined address range data does not contain any suitable free address ranges.

\* \* \* \* \*